(12) United States Patent
Zhang et al.

(10) Patent No.: US 7,096,488 B1
(45) Date of Patent: Aug. 22, 2006

(54) METHODS AND APPARATUS FOR FACILITATING NETWORK SPLICING

(75) Inventors: Ji Zhang, San Jose, CA (US); Joseph Davis, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 588 days.

(21) Appl. No.: 10/103,280

(22) Filed: Mar. 19, 2002

Related U.S. Application Data

(60) Provisional application No. 60/346,234, filed on Oct. 19, 2001.

(51) Int. Cl.
*H04N 7/173* (2006.01)

(52) U.S. Cl. .................. 725/105; 725/36; 725/32; 382/235; 375/240.26; 375/240.01

(58) Field of Classification Search .......... 375/240, 375/240.01, 240.26; 725/36, 32, 105; 382/232, 382/235
See application file for complete search history.

(56) References Cited

U.S. PATENT DOCUMENTS

| | | | |
|---|---|---|---|
| 5,907,374 A | 5/1999 | Liu | |
| 5,912,709 A | 6/1999 | Takahashi | |
| 5,982,436 A | 11/1999 | Balakrishnan et al. | |
| 6,038,000 A | 3/2000 | Hurst, Jr. | |
| 6,101,195 A | 8/2000 | Lyons et al. | |
| 6,104,441 A * | 8/2000 | Wee et al. | 375/240.15 |
| 6,487,721 B1 * | 11/2002 | Safadi | 725/36 |
| 6,611,624 B1 * | 8/2003 | Zhang et al. | 382/232 |

OTHER PUBLICATIONS

International Organisation for Standardisation Organisation Internationale De Normalisation, "Generic Coding of Moving Pictures and Associated Audio: Systems", ISO/IEC JTC1/SC29/WG11/N0801, Nov. 13, 1994.
Society of Cable Telecommunications Engineers, Inc. Engineering Committee Digital Video Subcommittee, "Digital Program Insertion Splicing API", Document DVS, Nov. 15, 2000, 28 pages.
Carlos V. Girod, Jr. "Standards and Recommended Practices", SMPTE Journal, Oct. 1998, pp. 915-925.
M. Knee and N. Wells, "Seamless Concatenation—A 21st Century Dream", Paper Presented at the International Television Symposium (ITVS) Montreux, Jun. 16, 1997, 11 pages.

(Continued)

*Primary Examiner*—Shawn S. An
(74) *Attorney, Agent, or Firm*—Beyer Weaver & Thomas, LLP

(57) ABSTRACT

The invention provides systems and methods for providing compressed video data from multiple bit streams. The systems and methods apply a two-stage strategy. In the first stage, a conditioning step is performed on a bit stream comprising compressed video data which outputs a conditioned bit stream that is able to receive digital insertions without subsequent decompression of the compressed video data or removal from network packets. The conditioning includes recoding an incoming bit stream such that compressed video data in the bit stream immediately before and after a splice point does not have temporal reliance across the splice point. In the second stage, e.g., at a downstream network device, splicing of compressed video data from a second bit stream into the conditioned bit stream is performed. The splicing takes advantage of the changes made to the conditioned bit stream and may occur at the network packet level.

22 Claims, 10 Drawing Sheets

OTHER PUBLICATIONS

Motion Picture and Television Engineers, "SMPTE Standard for Television—Splice Points for MPEG-2, Transport Streams", SMPTE 312M-1999, 20 pages.

Le Gall, Didier J. "MPEG: A Video Compression Standard for Multimedia Applications", Communications of the ACM, Apr. 1991, vol. 34, No. 4, pp. 47-57.

Le Gall, Didier J. "MPEG Video Compression Algorithm. A Review". Proc. SPIE vol. 1452, Image Processing Algorithms and Techniques II (1991), pp. 444-457.

Joe Davis, "Digital Video Systems Document" Invention Disclosure, San Jose, California Jul. 16, 1997.

* cited by examiner

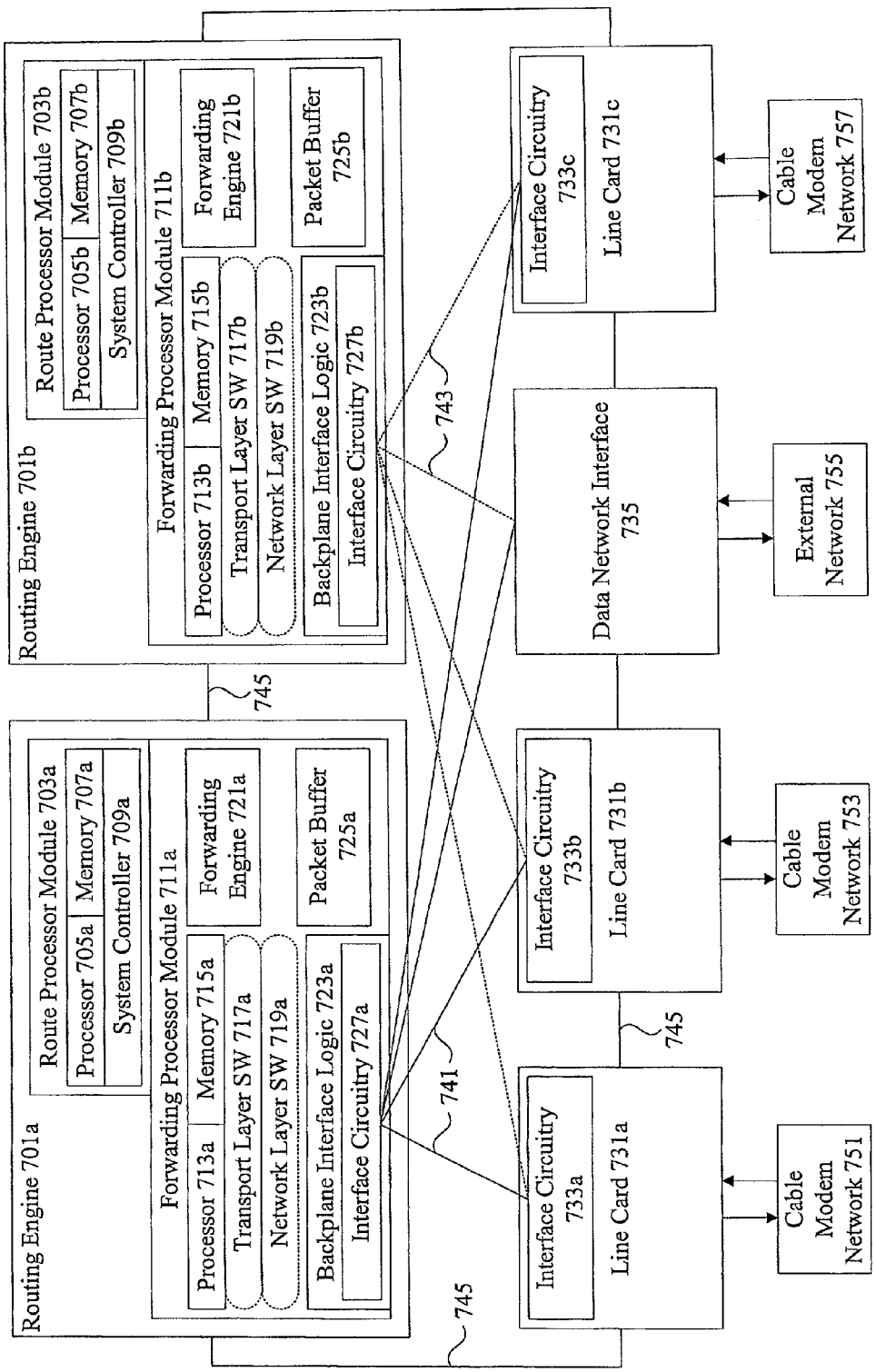

METHODS AND APPARATUS FOR FACILITATING NETWORK SPLICING

CROSS-REFERENCE TO RELATED APPLICATION

This application claims priority under 35 U.S.C. § 119(e) from co-pending U.S. Provisional Patent Application Ser. No. 60/346,234 entitled "Methods and Apparatus for Facilitating Network Splicing" filed on Oct. 19, 2001 and naming Ji Zhang et al. as inventors, which is incorporated by reference herein for all purposes.

BACKGROUND OF THE INVENTION

The present invention relates generally to systems and methods for transmitting data. More specifically, the present invention relates to systems and methods for transmitting compressed digital video data in a manner that allows downstream network devices to splice multiple compressed video bit streams using network packet level manipulation.

There are presently a variety of different communication channels for transmitting or transporting video data. For example, communication channels such as coaxial cable distribution networks, digital subscriber loop (DSL) access networks, ATM networks, satellite, or wireless digital transmission facilities are all well known. In fact, many standards have been developed for transmitting data on the communication channels. The present invention relates to data transmission on such communication channels, and for the purposes of the present application a channel is defined broadly as a connection facility to convey digital information from one point to another. A channel includes some or all of the following elements: 1) physical devices that generate and receive the signals (including a modulator/demodulator); 2) a medium that carries the actual signals; 3) mathematical schemes used to encode and decode the signals; 4) proper communication protocols used to establish, maintain and manage the connection created by the channel 5) storage systems used to store the signals such as magnetic tapes and optical disks. The concept of a channel includes but is not limited to a physical channel, but also logical connections established on top of different network protocols, such as XDSL, ATM, IP, wireless, HFC, coaxial cable, Ethernet, Token Ring, etc.

The channel is used to transport a bit stream, or a continuous sequence of binary bits used to digitally represent video, audio or data. A bit rate is the number of bits per second used to transport the bit stream. Compression of video data is an approach that has been used to make digital video images more transportable. Digital video compression schemes allow digitized video frames to be represented digitally in much more efficient manner. Compression of digital video makes it practical to transmit the compressed signal using digital channels at a fraction of the bit rate required to transmit the original signal without compression.

In addition to the video compression scheme, a channel may also implement its own network protocol. For example, two common network protocols currently used are Internet Protocol (IP) and Asynchronous Transfer Mode (ATM). Both network protocols implement different rules which can be used to transport data or multimedia bit streams. For example, ATM specifies how data is first packetized into fixed sized data units, called cells. It also specifies how such a cell stream can be multiplexed, de-multiplexed, switched and routed between different locations to support end-to-end connections at a given bit rate.

Existing communication channels are frequently used for delivery of video. In some multimedia delivery applications, compressed video programs are delivered simultaneously to numerous digital receiver/decoders. In such multi-cast situations, the same bit stream may spread from a source to numerous receivers simultaneously via multiple channel paths. The original bit stream is often altered on each of these paths. For example, local advertisers may intercept a video program (e.g., a CNN feed or a nationally broadcast sporting event) and insert local content comprising local advertising.

Digital stream insertion (also called digital program insertion (DPI), digital spot insertion, etc.) is a process that replaces part of a digital bit stream by another bit stream. For the above multi-cast situation, both bit streams are typically encoded off-line in a different location or at a different time. As a result of the insertion however, the resulting bit stream has the advertisement inserted into the network feed.

The underlying technique for DPI is bit stream splicing (also known as bit stream concatenation), where a transition is made from an old stream to a new stream. The transition is called splice point. Creating splice points in a bit streams comprising compressed data often requires decoding and re-encoding of one or both compressed bit streams in order to allow seamless output of the video data from a decoder. For example, in order to complete a splicing process for an MPEG coded video data, an anchor frame with full picture data, i.e., an I frame, should be present at splicing points so that the switch from local content back to the broadcast content maintains compressed video data syntax integrity. For switching from the broadcast content into local content, the last coded picture in the broadcast bitstream has no reference into the future (sometimes called closed GOP condition) to avoid referencing an unrelated local content picture. However, compressed video programs transmitted in a broadcast typically do not always have anchor frames placed in splicing locations for digital ad segments.

Some current mechanisms for dealing with this problem include skipping frames, inserting black frames, and forcing overflow and underflow of video buffers. These mechanisms may all diminish output video quality. An alternative way to solve this problem is to create closed GOP and I frame for all potential local content insertions, i.e., closed GOP condition in the broadcast bitstream is formed at the point of local content insertion, and the first coded picture in the broadcast bitstream after the insertion is an I frame. This requirement implies that the broadcast encoder knows exactly where local content insertion will occur. This generally is not true because originally encoded content typically is sent to many geographic locations, at different times of the day. If a subsequent insertion point is not where the encoder assumed it to be, insertion can not be made. Making more frequent splicing points in the bitstream would make it more likely that the subsequent insertion can be done, but it comes at the cost of decreased bandwidth efficiency since I frames consumes considerably more bits than P and B frames.

The third approach to the above problem is not to encode splicing points at the encoder, and let the downstream splicer re-encode the content to satisfy the splicing requirement. This is also computationally expensive method since each splicer must re-encode the network bit stream and generate I frames. This decoding and re-encoding may be redundantly performed for each content insertion point downstream in the multi-cast. In addition, the network transmission protocol must also be overcome to access the compressed video data, e.g., the compressed video data must be removed from the network packets, decoded and re-encoded, and then repacketized into the network packets. The layered structure of network packets and protocols typically implies no data alignment between the video data payload and the network packets that contain it. Therefore, additional packet decapsulation and encapsulation must be performed to re-format the data for network transport. Each of these steps introduces complexity and transmission inefficiency to the multicast and increases the difficulty in providing seamless and efficient multi-cast applications.

Further, the compressed video bit streams are usually generated by either real-time encoders or pre-compressed video server storage systems. Both are likely to be in remote sites, each away from the network itself. This increases the difficulty in encoding the video signal to allow downstream digital stream insertion. As a result, the prior art systems assume that the splicing and compression steps are performed within the same equipment.

Therefore, there is a need for improved methods and systems for providing video data from multiple sources.

SUMMARY OF THE INVENTION

The present invention overcomes the deficiencies and limitations of the prior art with improved systems and methods for providing compressed video data.

In one embodiment, bitstream conditioning is accomplished in two stages involving three reference points. The first reference point is the original program encoder. This encoder will not create any splice points, its job is to encode video data at its best possible quality, adopting whatever I/P/B frame structure it deems necessary to accomplish this goal. The second reference point is the conditioning device, multiple of which typically are located away from the encoder but are sharing the same content. Each such device may have its own independent local content insertion schedule. Each of the conditioning network device feeds the third reference points—the splicers. Typically multiple splicers share the same network conditioners. The splicer may implement a simple packet level switch.

In another embodiment, there are two main ideas behind this invention. This first one is that by properly conditioning the broadcast bitstream downstream from the original encoding, it is possible to avoid having an original encoder unnecessarily produce too many splice points to anticipate an unknown number of splicings downstream, thus improving bandwidth efficiency. The second point is that when the downstream network device conditions the bitstream by re-encoding, it can also align the data payload with upper layer packet format, so that splicing can be reduced to a simple packet level switching. For example, say, an MPEG-2 video elementary stream splice point is created, then carried as MPEG-2 transport packet, which in turn is encapsulated into IP payload. The conditioning would make sure that the first payload byte of the MPEG-2 transport packet carrying the splice point elementary stream is indeed the first byte of the splice point, AND the first payload byte of the IP packet is the first byte of the above mentioned MPEG-2 transport packet. Therefore, an IP level switching results in a clean elementary stream splicing, making the splicing operation extremely simple. In addition, this video splicing operation can be accomplished without an MPEG aware system, e.g., an IP switch may be sufficient.

In one aspect, the present invention relates to a method for providing a conditioned bit stream comprising modified compressed video data. The method comprises receiving a bit stream including compressed video data. The method also comprises determining a splice point corresponding to a digital insertion location within the bit stream. The method further comprises recoding a portion of the compressed video data such that temporal reliance between compressed video data before the splice point and compressed video data after the splice point is removed. The recoding produces the modified compressed video data. The method additionally comprises outputting the conditioned bit stream comprising the modified compressed video data onto a channel.

In another aspect, the present invention relates to a method for providing a bit stream onto a channel. The method comprises receiving a conditioned bit stream comprising a digital insertion location and a second bit stream comprising compressed video data. The method also comprises splicing the compressed video data included in the second bit stream into the digital insertion location by splicing network packets from the second bit stream and network packets from the conditioned bit stream. The splicing provides an output bit stream comprising compressed video data included in the conditioned bit stream and the compressed video data included in the second bit stream. The method further comprises providing the output bit stream onto the channel.

In yet another aspect, the present invention relates to a network device for providing a conditioned bit stream comprising modified compressed video data. The network device comprises a conditioning apparatus that receives a bit stream including compressed video data and outputs the conditioned bit stream comprising the modified video data and information describing a splice point corresponding to a digital insertion location. The conditioning apparatus is configured to modify the compressed video data by removing temporal reliance between compressed video data before the splice point and compressed video data after the splice point. The network device also comprises a network interface that outputs the conditioned bit stream onto a channel.

In still another aspect, the present invention relates to a network device for providing a bit stream onto a channel. The network device comprises a network interface configured to receive a conditioned bit stream comprising a digital insertion location and to receive a second bit stream comprising compressed video data. The network device also comprises a splicing apparatus configured to splice the compressed video data included in the second bit stream into the digital insertion location by splicing network packets from the second bit stream and network packets from the conditioned bit stream. The splicing apparatus provides an output bit stream comprising compressed video data included in the conditioned bit stream and the compressed video data included in the second bit stream. The network device further comprises a network interface that outputs the output bit stream onto the channel.

In another aspect, the present invention relates to a network device for providing a bit stream onto a channel. The network device comprises means for receiving a bit stream including compressed video data. The network device also comprises means for determining a splice point corresponding to a digital insertion location within the bit stream. The network device further comprises means for recoding a portion of the compressed video data such that temporal reliance between compressed video data before the splice point and compressed video data after the splice point is removed, the recoding producing the modified compressed video data. The network device additionally comprises means for outputting the conditioned bit stream comprising the modified compressed video data onto a channel.

In another aspect, the present invention relates to a computer readable medium including instructions for modifying a bit rate of a bit stream to use an available bandwidth of a channel. The instructions comprise instructions for receiving a bit stream including compressed video data. The instructions also comprise instructions for determining a splice point corresponding to a digital insertion location within the bit stream. The instructions further comprise instructions for recoding a portion of the compressed video data such that temporal reliance between compressed video data before the splice point and compressed video data after the splice point is removed, the recoding producing the modified compressed video data. The instructions additionally comprise instructions for outputting the conditioned bit stream comprising the modified compressed video data onto a channel.

These and other features and advantages of the present invention will be described in the following description of the invention and associated Figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7 shows a block diagram of a specific embodiment of a Cable Modem Termination System (CMTS) which may be used to implement certain aspects of the present invention.

DETAILED DESCRIPTION OF THE PREFERRED EMBODIMENTS

Figure 1:
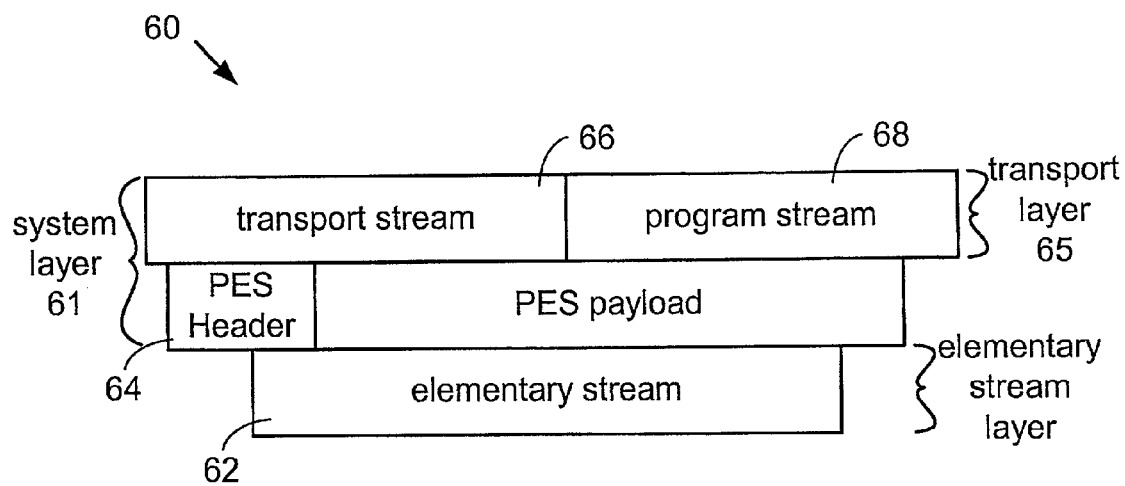
FIG. 1 illustrates a transmission bit stream having an MPEG-2 format in accordance with one embodiment of the present invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In some instances, well known process steps and/or structures have not been described in detail in order to not unnecessarily obscure the present invention.

The present invention provides systems and methods for providing compressed video data from multiple bit streams. The systems and methods described herein apply a two-stage strategy. In the first stage, a conditioning step is performed on a bit stream comprising compressed video data which outputs a conditioned bit stream that is able to receive digital insertions without subsequent decompression or timely processing of the compressed video data. The conditioning includes recoding an incoming bit stream such that compressed video data in the bit stream immediately before and after a splice point corresponding to a digital insertion location does not have temporal reliance across the digital splice point. This first stage may be performed by an upstream network device that transmits the conditioned bit stream onto a network channel.

The compressed video data may also be packetized in network packets. Since temporal reliance of the compressed video data from opposite sides of the splice point has been removed, the compressed video data from opposite sides of the splice point may be placed in separate network packets. Correspondingly, digital insertion of downstream video programs or local content into the digital insertion location may occur without removing the compressed video data from the transmission packets. Thus, downstream splicing of video content with the conditioned bit stream, which may occur at different locations are different times, may occur without decompression of the video data in the conditioned bit stream—or removal of the video data from the network packets used to transmit the conditioned bit stream.

In the second stage, e.g., at a downstream network device, splicing of compressed video data from a second bit stream into the conditioned bit stream is performed. The splicing takes advantage of the changes made to the conditioned bit stream. Since the conditioned bit stream was previously recoded to allow the splicing at the digital insertion locations, splicing at this time may occur without recoding of compressed video data in the conditioned bit stream. In addition, the splicing may occur at the network packet level—without removing the video data from the network packets.

Compression according to the MPEG standard will first be briefly described in order to facilitate the following description of one embodiment of the present invention. While the present invention will now primarily be described in terms of transmission based on manipulation of video data compressed according to MPEG standards, the present invention may use other video compression and packaging schemes. Other compression standards suitable for use with the present invention may include MPEG-1/2/4 compression, H.26X compression for video conferencing, compression using proprietary video stream formats, and compression of non-real-time data bit streams, or any other compression formats that use block based compression.

FIG. 1 illustrates a transmission bit stream 60 having an MPEG-2 format in accordance with one embodiment of the present invention. The MPEG-2 compression standard consists of two layers of information: a system layer 61 an elementary stream layer 62.

The system layer 61 is defined to allow a decoder to correctly decode audio and video data, and present the decoded result to the video screen in a time continuous manner. The system layer 61 comprises two sub layers: a packetized elementary stream (PES) layer 64 and transport layer 65 above the PES layer 64. PES layer 64 defines how the elementary stream layer is encapsulated into variable length packets called PES packets. In addition, the PES layer 64 includes presentation and decoding timestamps for the PES packets. Transport layer 65 defines how the PES packets are further packetized into transport packets. For example, the PES packets may be packetized into fixed sized packets of 188 bytes to produce a network stream according to a specific network protocol. Additional timing information and multiplexing information may be added by the transport layer 65. The transport layer 65 is further divided into a transport stream 66 and a program stream 68. The transport stream 606 is optimized for use in environments where errors are likely such as storage or transmission in a lossy or noisy media. Applications using the transport stream 66 include Direct Broadcast Service (DBS), digital or wireless cable services, broadband transmission systems, etc. The program stream 68 defines how the PES packets are encapsulated into variable sized packets and may also include additional timing in multiplexing information. The program stream 68 is designated for use in relatively error free environments and is suitable for applications that may involve software processing of system information such as interactive multimedia applications.

The elementary stream layer 62 defines how compressed video (or audio) data signals are sampled, motion compensated, transform coded, quantized and represented by different variable length coding (VLC) tables. The elementary stream layer 62 contains the coded picture data. The basic structure for the coded picture data is a block which comprises an 8 pixel by 8 pixel array. Multiple blocks form a macroblock, which in turn forms part of a slice. A coded picture consists of multiple slices. Multiple coded pictures form a group of pictures. Such hierarchical layering of data structures allows processing according to one embodiment of the present invention to occur on a compressed layer, namely coded pictures. In one embodiment, conditioning of compressed MPEG-2 video data is a process that occurs on the coded pictures.

The access unit level information relates to a coded picture and may specify whether the picture is an intra frame (I frame) containing full picture information, a predicted frame (P frame) which is constructed using a past I or P frame, or a bidirectional frame (B frame) which is bi-directionally constructed using past or future I, P or B frames. Splicing in accordance with one embodiment of the present invention occurs between frames of a compressed bit stream.

Temporal reliance in compressed video data is an artifact of compression. Generally speaking, temporal reliance in compressed video data refers to relationships and dependency between different portions of the compressed data created during compression of the raw video data. Compression typically reduces the bit rate required to transmit video data by removing temporal redundancy between video frames. For MPEG compression, motion estimation removes temporal redundancy between frames using motion vectors. The motion vectors from one frame may reference another frame in order to reduce the bit rate required to transmit the video data; thus creating temporal reliance between compressed video frames (e.g., between a P frame and a preceding I frame). The present invention removes temporal reliance between compressed video data for portions of a bit stream. More specifically, the present invention recodes compressed video data surrounding splicing locations such that the bit stream may be subsequently spliced without incurring video output degradation resulting from splicing between temporally dependent compressed video data. Although the present invention removes the temporal reliance of the compressed video data surrounding a digital insertion location, the uncompressed video data may still be related in a time continuous manner if no video splicing takes place, as one of skill in the art will appreciate.

The structure of an MPEG bit stream is well-known to one of skill in the art and is described by the MPEG standards. The present invention is suitable for use with the MPEG-1 specification, described in ISO/IEC International Standard 11172; "Coding of moving pictures and associated audio for digital storage media up to about 1.5 Mbits/s", November 1993, which is herein incorporated by reference. The present invention is also suitable for use with the MPEG-2 specification, described in ISO/IEC International Standard 13818; "Generic coding of moving pictures and associated audio information", November 1994, which is herein incorporated by reference. The present invention is also suitable for use with the MPEG-4 specification, described in ISO/IEC International Standard; "Coding of moving pictures and associated audio information", March 2000, which is herein incorporated by reference.

A splice point can be defined differently, depending on which layer of the MPEG bit stream one is referring to. At the elementary stream level, a splice point is the point that separates the data between two neighboring access units, i.e., all data after this point belongs to the next coded frame, and all data before it the previous frame. On a higher layer, the higher layer splice points refers to delineation of the packet such that the splice point is at packet boundaries, not with the payload of the packets. Specifically, a PES layer splice point is often the first PES packet whose elementary stream payload starts with the first byte after the elementary stream splice point. Extending this logic one more layer, a transport packet splice point is the first transport packet whose payload starts with the first byte of the PES layer splice point. A similar logic may be applied to an IP splice point, ATM splice point, or other protocol frame splice point, etc.

Although the context of splicing described herein is to switch between network broadcast signal and the local, advertisement, signal, it is understood that splicing as described herein can be applied to other scenarios, between two video files, between two live network signals, etc. Splicing is an operation that switches off a bitstream and switches on another in a time continuous way. Therefore, splice points are ambiguous in that splice-in and splice-out can both be said about an operation, depending on which bitstream you are referring to. i.e., switch bitstream A to bitstream B is the splicing out of A but into B, or the end of splicing for B but the beginning of splicing of A. For the discussion provided herein, we describe only one of the splices, namely, the 'live' network bitstream will be spliced in by the local advertisement content. However, it is understood that the conditioning of bitstreams, therefore, may be applied to both streams. For switching from a network signal into a local advertisement signal, the following two constraints are commonly applied:

1. (in display order) the last coded frame of the network signal does not reference any frame in the future, i.e., it is an I or P frame, or if it's a B frame, does not reference future anchor frames (also known as the closed GOP condition).
2. For the local advertisement signal, the first frame of the bitstream starts with an I frame and last frame.

For switching from the local advertisement back to the network signal, the above two requirements remain, except they are applied the other way around on the two signals. Because we are under the assumption that the local advertisement, being produced off-line, meets the requirement (i.e., first frame is I and last frame is I/P or a closed GOP B), the conditioning device as described above is used to process only the real-time network broadcast signal so that the last network frame before the local ad frame is closed GOP and the first frame after the last local ad frame is an I frame.

Generally, since two independently encoded video bitstreams are spliced together, their timebases are often independent. If no change is done to the timebase, the spliced bitstream may have a discontinuous timebase. There are several ways to deal with this situation. One way is to adjust the spliced bitstream timestamps so that the timebase becomes a continuous progression with real-time. A second way is to set flags in the upper layer system headers (in transport packet header) that indicate there is a discontinuity in the timebase, which the receiver will be able to recognize and properly reset its clock to track to the new timebase.

Figure 2:
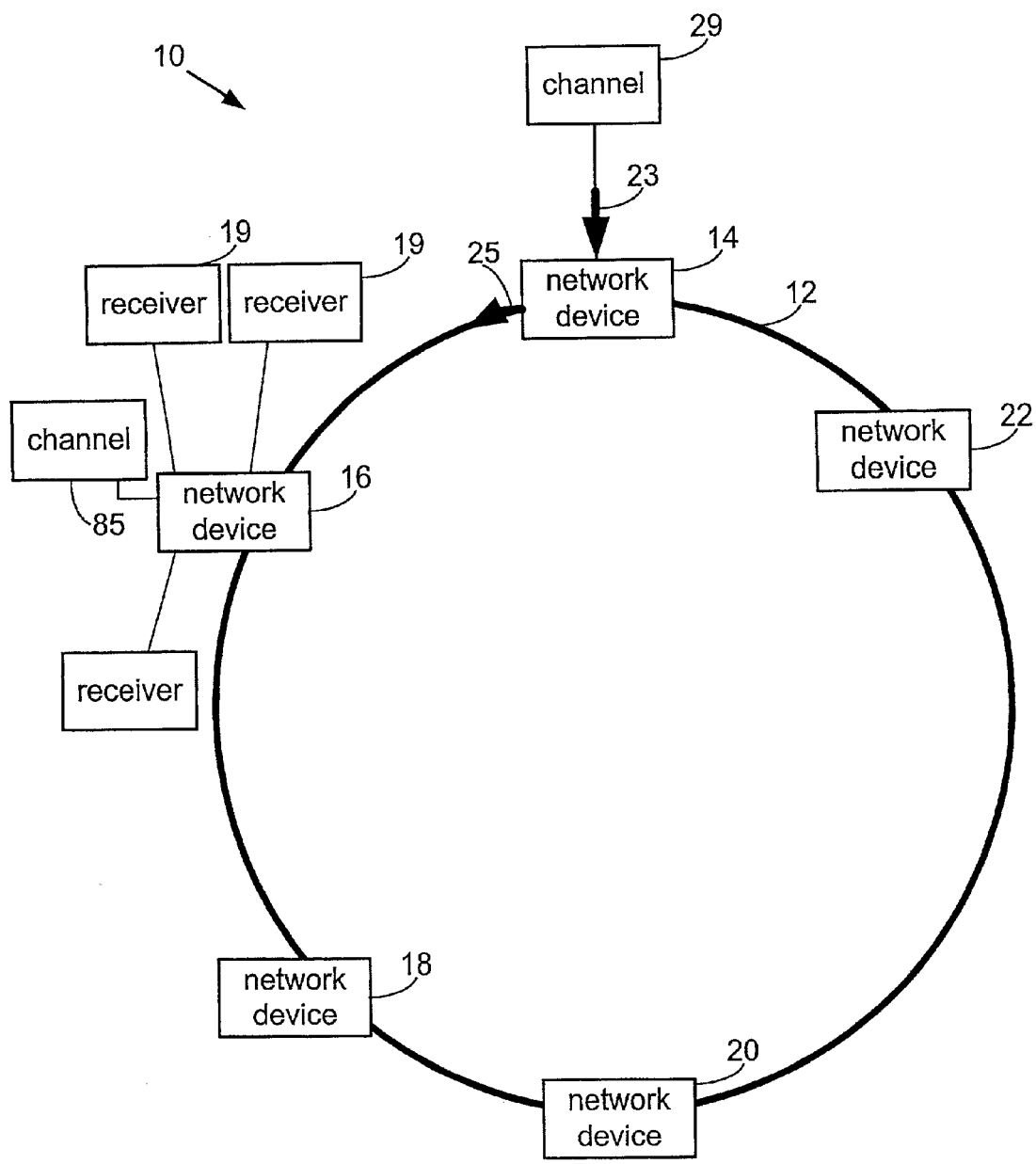
FIG. 2 illustrates an exemplary network system for transmitting compressed video data in accordance with one embodiment of the present invention.

FIG. 2 illustrates an exemplary network system 10 for transmitting compressed video data in accordance with one embodiment of the present invention. System 10 comprises a medium 12 that allows digital communication between upstream network device 14 and downstream network devices 16, 18, 20, and 22. The network device 14 may be a central office, router, super head end, or a headend, for example. In a specific embodiment, medium 12 comprises an optical ring and upstream network device 14 corresponds to a super head end that services numerous local head ends 16, 18, 20, and 22. In some network systems, each of the local head ends 16, 18, 20, and 22 service a geographic service area of a cable network. In another specific embodiment, network device 14 corresponds to a head end that services numerous edge network devices 16, 18, 20, and 22.

System 10 is well-suited for use in multimedia delivery applications that use digital program insertion. For example, a suitable application for system 10 includes multicast broadcasts where local advertisement insertion or program switching by head ends 16, 18, 20, and 22 is desirable. In these broadcasts, pre-compressed segments of digital video and/or audio bit streams, such as advertisement content, replace segments of an ongoing video and/or audio program, such as a network feed. For system 10, compressed video programs are delivered to numerous digital receiver/decoders via transmission channels progressing through network device 14 and downstream network devices 16, 18, 20, and 22.

The system 10 is also suitable for real-time transmission of video data to receivers 19. In such multicast broadcasts, video content in the bit stream 23 passing through network device 14 is delivered in real-time to different end receiver/decoders via network devices 16, 18, 20, and 22. One or more of the network devices 16, 18, 20, and 22 may also insert local video content in real-time before receipt by the target decoders. In these cases, network device 14 anticipates the insertion of local content by any one network devices 16, 18, 20, and 22 and assists the real-time functioning of system 10.

To assist downstream digital insertion, network device 14 modifies bit stream 23 and produces a conditioned bit stream 25. Conditioned bit stream 25 has been altered to facilitate downstream splicing and digital insertion. More specifically, network device 14 includes information that may be used to identify digital insertion locations in bit stream 25. These digital insertion locations are portions of conditioned bit stream 25 at which video content, such as compressed video including local advertising, may be inserted. In addition, network device 14 modifies compressed video data in bit stream 23 by removing temporal reliance between compressed video data before each splice point of a digital insertion location and compressed video data after each splice point.

In one embodiment, network device 14 recodes video data in bit stream 23 immediately following a potential splice point such that the last frame of the network bitstream before the first coded frame of the local content being switched in is a closed GOP frame, and the first frame of the network bitstream following the last frame of the local content is an I frame. In a specific embodiment, the conditioning consists of two steps, the first step is to 'cleanup' a network feed before an ad comes in, i.e., closed GOP, so that the last network frame, if it's a B frame, refers only to its previous frame—and is no longer a bi-directional reference. For a P frame this is already the case, and no action is needed. The second step is to 'cleanup' the network feed after the ad stops and back to the network, the first network frame is an I frame because it can not use any ad content as its first reference.

In addition, it is assumed that the first and last frame of the ad (aka local) content are already properly conditioned (i.e., first frame is I and last frame is closed GOP, note how the order of these differs from the network content conditioning). This is usually the case because local content is typically generated off-line. In another embodiment, both local and network (aka. broadcast) content are provided in real-time. In this case, conditioning is done in real-time for both bit streams. Correspondingly, when local video content is inserted into compressed bit stream 25, seamless splicing of the insertion may occur. Network device 14 also packetizes the compressed video data into network packets for transmission on medium 12. The packetization is performed such that downstream splicing may occur at the network packet layer level.

Network devices 16, 18, 20, and 22 insert local video content to bit stream 25. As a result of the modification by network device 14, downstream network devices 16, 18, 20, and 22 that receive conditioned bit stream 25 may perform digital insertion and splicing on conditioned bit stream 25 without decoding the compressed video data included therein. In addition, each downstream network device may also insert or splice the local video content at the network packet layer level. Each of the network devices 16, 18, 20, and 22 may also be adapted to use information embedded the incoming modified compressed bit stream 25 to facilitate insertion of local content.

The present invention avoids decoding and re-encoding at the remote network devices 16, 18, 20, and 22 and transfers this processing to network device 14. For a transmission system 10 having numerous remote network devices 16, 18, 20, and 22 (e.g. hundreds of headends), this results in considerable computational savings for system 10, and may improve transmission efficiency and speed for multicast transmission of bit stream 23. System 10 then relies on the network device 14 to perform re-encoding of compressed video data bordering digital insertion locations used during transmission of bit stream 23. Thus, downstream splicing according to system 10 bypasses computationally expensive re-encoding at the remote network devices 16, 18, 20, and 22.

Advantageously, this reduces the required resources and complexity for each downstream network device. The reduced required resources for each downstream network device reduces costs for service providers and increases flexibility in implementing a new device. For example, allowing downstream splicing in this manner reduces downstream network device costs since splicing may be performed using a simple switch of transport packets. Thus, a simple switch of transport packets is suitable for compressed video data switching between conditioned bit stream 25 (a network feed) and the local bit stream according to the local video content (e.g., an advertisement). Conditioning in this manner also allows downstream network devices to perform compressed video data switching and splicing at higher level protocols—such as IP, ATM, and other network protocol layers—without introducing video artifacts. In some cases, the downstream network device may not even be MPEG compliant, or compliant to the compression format used in compressing the video data.

Allowing network devices 16, 18, 20, and 22 to insert local compressed video content into conditioned bit stream 25 without decompression of compressed video data included therein allows regional operators (e.g., local advertisers) to provide local video content insertion without compromising video quality. Without this approach, I frames in an MPEG bit stream 23 are frequently inserted into a bit stream to anticipate possible splicing points used by a downstream operator; causing bandwidth inefficient video compression and transmission. In addition, allowing network devices 16, 18, 20, and 22 to insert compressed video content as described allows frame precise splicing, thus allowing local content providers such as cable operators to increase revenue opportunity with a given advertisement avail.

Figure 3A:
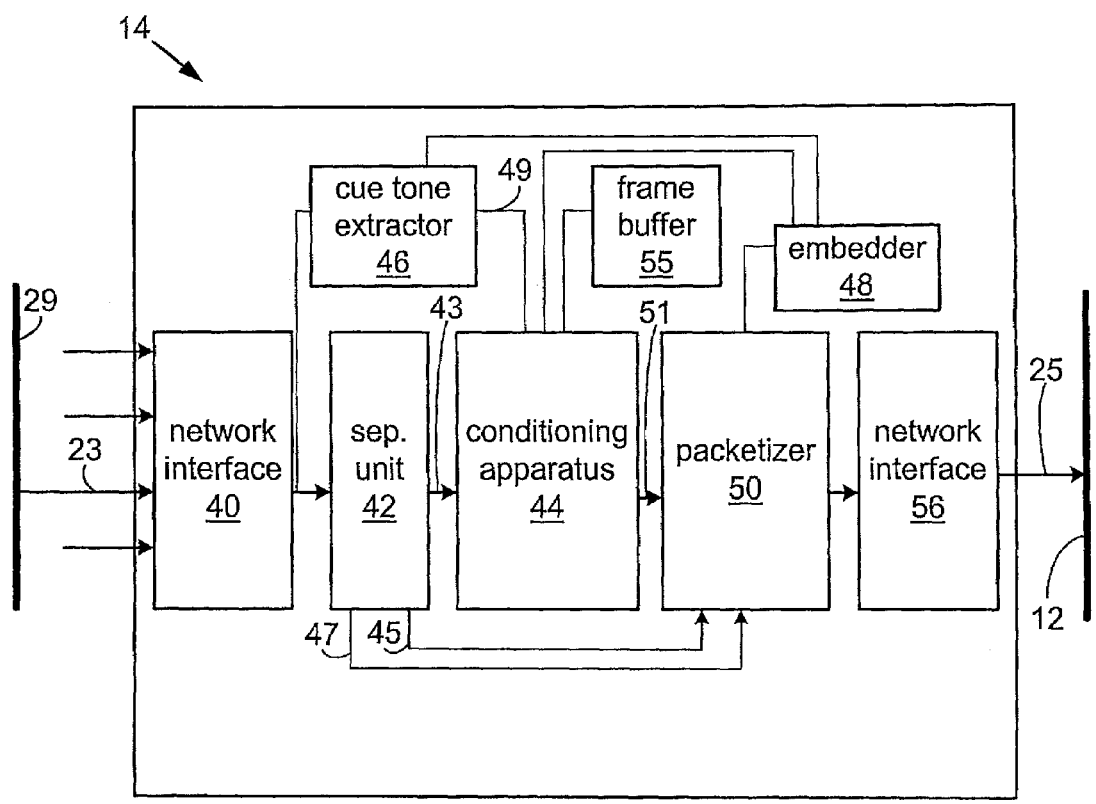
FIG. 3A illustrates a network device of FIG. 2 in more detail in accordance with one embodiment of the present invention.

FIG. 3A illustrates network device 14 of FIG. 2 in more detail in accordance with one embodiment of the present invention. While the network device 14 will now be described as an apparatus composed of units, those skilled in the area will recognize that the present invention encompasses a method, process or software having as steps the actions performed by each unit and described below. Network device 14 comprises network interface 40, separation unit 42, conditioning apparatus 44, cue-tone message extractor 46, a packetizer 50, and network interface 56.

Network device 14 is configured to receive bit stream 23 from channel 29 (FIG. 2). Network device 14 has a plurality of inputs included in network interface 40, which performs any network later functions to receive bit stream 23.

One input of separation unit 42 is coupled to an output of network interface 40 to receive bit stream 23. Separation unit 42 preferably de-multiplexes bit stream 23 to obtain the compressed video data 43 data included therein. This may include de-multiplexing the network layer stream (also commonly referred to as the system layer stream), removing filler packets/frames as appropriate, and other steps necessary to obtain the video bit stream containing video data 43, the audio bit stream 45 and a data bit stream 47. Those skilled in the art will understand the operation of the separation unit 42.

The compressed video data 43 is provided to conditioning apparatus 44. Conditioning apparatus 44 is aware of potential digital insertion locations that may be used to insert downstream video content into conditioned bit stream 25. In one embodiment, network device 14 comprises a cue-tone extractor 46 that obtains a cue-tone message 49 from bit stream 23 and uses the cue-tone message to identify digital insertion locations and their corresponding splice points in bit stream 23. Based on known locations were downstream video content may be inserted into conditioned bit stream 25, conditioning apparatus 44 modifies compressed video data from bit stream 23 by removing temporal reliance between compressed video data before each splice point and compressed video data after each splice point.

For example, if the first coded picture immediately after a splice point is an I frame and does not temporally reference compressed video data before the splice point, conditioning apparatus 44 does not recode the first coded picture immediately after the splice point. On the other hand, if the first coded picture immediately after the splice point is a P-frame frame or a B-frame that temporally references compressed video data before the splice point, conditioning apparatus 44 recodes the frame to an I frame. In addition, if the last frame in the network bitstream before the local bitstream is switched in is a P frame, nothing is done, but if it's a B frame, recoding will be done to remove temporal reference between the B frame and future frames (as they will be replaced by new and unrelated local frames).

Conditioning apparatus 44 decodes and re-encodes video data 43 under MPEG-2 protocol and produces either an MPEG-2 transport stream, an MPEG-2 packetized elementary stream (PES) or an MPEG-2 elementary stream. Depending on which format is used, additional processing may be implemented in packetizer 50. For simplicity, the following discussion will focus on an elementary stream produced by conditioning apparatus 44. Transport level and PES processing may include additional packetization as will be described in further detail below. Conditioning apparatus 44 may be a single structure or multiple structures. In one embodiment, the conditioning apparatus 44 implements ASIC basic hardware. In another embodiment where storage based multicasting of pre-encoded content is the application, conditioning apparatus 44 is implemented in software. In addition, the packetizer 50 and network interface may encapsulate the MPEG elementary stream in such a way that the first data byte of the elementary stream, higher layer PES packet, higher layer transport packet, and finally higher layer network packet (such as IP, ATM) are all aligned properly. This alignment is produced at the output 25.

For some bit streams 23, cue-tone message 49 identifies the last coded picture in bit stream 23 just before a digital insertion location as well as the duration of the digital insertion content (in absolute timestamp or in number of frames). If this coded picture temporally references compressed video data after a splice point corresponding to the beginning of a digital insertion location, conditioning apparatus 44 recodes the coded picture such that temporal dependency is removed. In addition, cue-tone message 49 may identify the first coded picture in bit stream 23 just after a splice point corresponding to the end of a digital insertion location. If this coded picture temporally references compressed video data before the digital insertion location, conditioning apparatus 44 recodes the coded picture such that temporal dependency is removed.

Frame buffer 55 is in electrical communication with conditioning apparatus 44 and stores one or more earlier coded pictures that are involved in the recoding process. An example of coded picture storage using frame buffer 55 will be described in further detail with respect to FIGS. 3B–3C.

The modified compressed video data 51 produced by conditioning apparatus 44 is provided to packetizer 50. Packetizer 50 performs the packetization of modified compressed video data 51 into MPEG-2 packets such that the digital insertion location splice points each are inserted into a new packet payload. As a result of this packetization, downstream splicing of video content for conditioned bit stream 25 may occur only by manipulating the packets. In addition, downstream splicing of network packets produced by packetizer 50 may occur without decompression or recoding of the compressed video data contained in the network packets.

Packetizer 50 may also be responsible for multiplexing of the modified compressed video data and audio 45 or general data 47 back into an MPEG compliant bit stream. This may also include other MPEG processing functions such as inserting stuffing bits and filler packets as appropriate. Compressed video data embedded in an MPEG-2 bitstream may be embedded in the elementary stream layer according to elementary stream format (as described above), the PES layer according to PES format, and/or the transport stream according to transport stream format. In the case of PES or transport stream formats, the entire payload may be the private data fields containing the non-MPEG-2 compressed video bitstream. This is allowable since the PES and transport streams provide syntax for identifying the type of entire payload as user private. For a given compression format, the difference between these embedding alternatives may include differences in the timing information, multiplexing information and other information not directly related to the re-encoding process. By way of example, when the compressed video data is embedded in elementary stream format, the bitstream contains no PES, transport or program system layer information.

Packetizer 50 also performs encapsulation of the MPEG-2 compliant bit stream into network packets according to network layer protocols, such as IP and/or ATM, frame relay, SONET, etc., such that digital insertion locations are properly aligned with packet payloads of the network layer protocols. In a specific embodiment, the splice point corresponds to the beginning of a digital insertion location and the packetizer 50 packetizes compressed video data after the splice point in a new network packet. In a specific embodiment, the splice point corresponds to the end of the digital insertion location and packetizer 50 places the first byte of an I frame for the elementary video stream 51 after the splice point and the first byte of the associated PES packet each as the first payload byte of a new network packet. As a result of this designation, the previous packet containing compressed video data for conditioned bit stream 25 may rest in a network packet with considerable space left in the network packet. In this case, packetizer 50 stuffs the packet was stuffing bits as appropriate. In another embodiment comprising IP protocol for conditioned bit stream 25, the size of the packet with considerable space left is converted to variable length to accommodate for the smaller size.

As a result of this re-packetization, digital insertion or splicing on conditioned bit stream 25 may be performed at the network layer protocol without introducing splicing artifacts, without removal from the network layer protocol packets, and/or without decompression of the modified compressed video data. In addition, this allows network devices such as network device 16 to be non-MPEG compliant to perform MPEG-2 video splicing of conditioned bit stream 25 and another bit stream including compressed video data.

Embedder apparatus 48 is coupled to packetizer 50 and appends information describing digital insertion locations in conditioned bit stream 25. Embedder apparatus 48 may receive the information describing digital insertion locations from conditioning apparatus 44 or cue-tone extractor 46. In one embodiment, packetizer 50 packetizes the modified compressed video data into MPEG-2 transport packets, and this information is embedded in transport packets with a unique packet identification. In some cases, this packet id, i.e. PID, may or may not change after the conditioning. If it is changed, equipment downstream not performing the splicing may not be aware of it, causing it to filter out the changed packets. In one embodiment, a special packet is inserted just before the splicing point packet to indicate the next packet contains the first data byte of the splice point) In this case, the information describes digital insertion locations for conditioned bit stream 25 according to specific identifications of MPEG-2 transport packets.

Embedder apparatus 48 may also store other information within conditioned bit stream 25. For example, bit rate profile information of conditioned bit stream 25 may be included to assist a downstream network device that re-multiplexes conditioned bit stream 25 with video data from another bit stream. In particular, the bit rate profile information may describe bit rate profile of portions of conditioned bit stream 25 (such as digital insertion location 104 of FIG. 3B) that will be replaced by the downstream content.

The output of the packetizer 50 is provided to network interface 56, which is coupled to medium 12. The output of network interface 56 forms the output of the bit rate converter 14, namely, conditioned bit stream 25. Network interface 56 outputs formats the data in conditioned bit stream 25 according to the protocol on medium 12 and transmits the data to a receiver connected to medium 12. Medium 12 may be any one of a number of conventional transmission systems, including but not limited to XDSL, ATM/ADSL, ATM, ISDN links, Ethernets, public data networks, T1, T3, DS-3, OC-3, wireless/terrestrial networks, digital satellites, and digital cable networks, and particular ones are described below. In one embodiment, conditioned bit stream 25 is transmitted in real-time. The network interface 56 may be a transmitter for any of those known in the art for DSL networks, IP networks or ATM networks, for example.

Figure 3B:
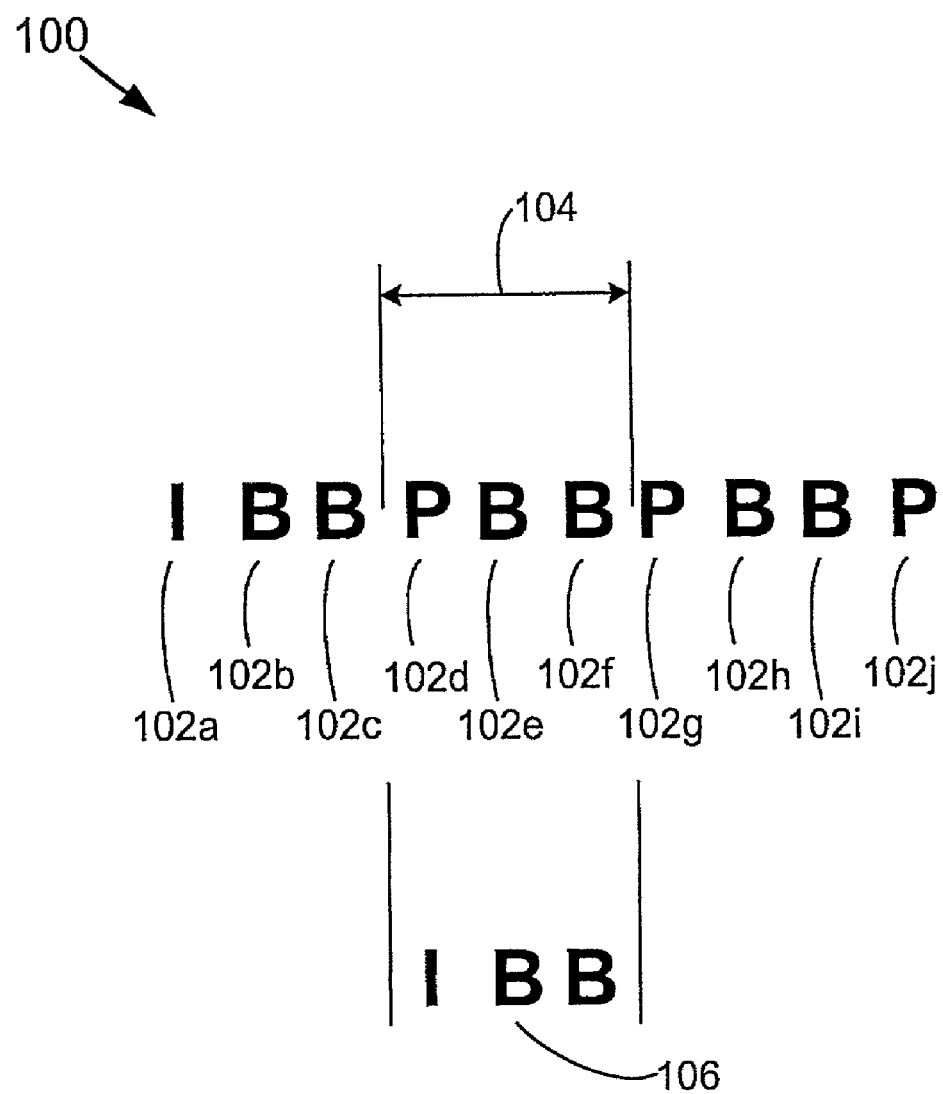
FIGS. 3B–3C show an illustrative recoding of a video portion included in a compressed bit stream, as performed by a conditioning apparatus of a network device of FIG. 2, in accordance with one embodiment of the present invention.
Figure 3C:
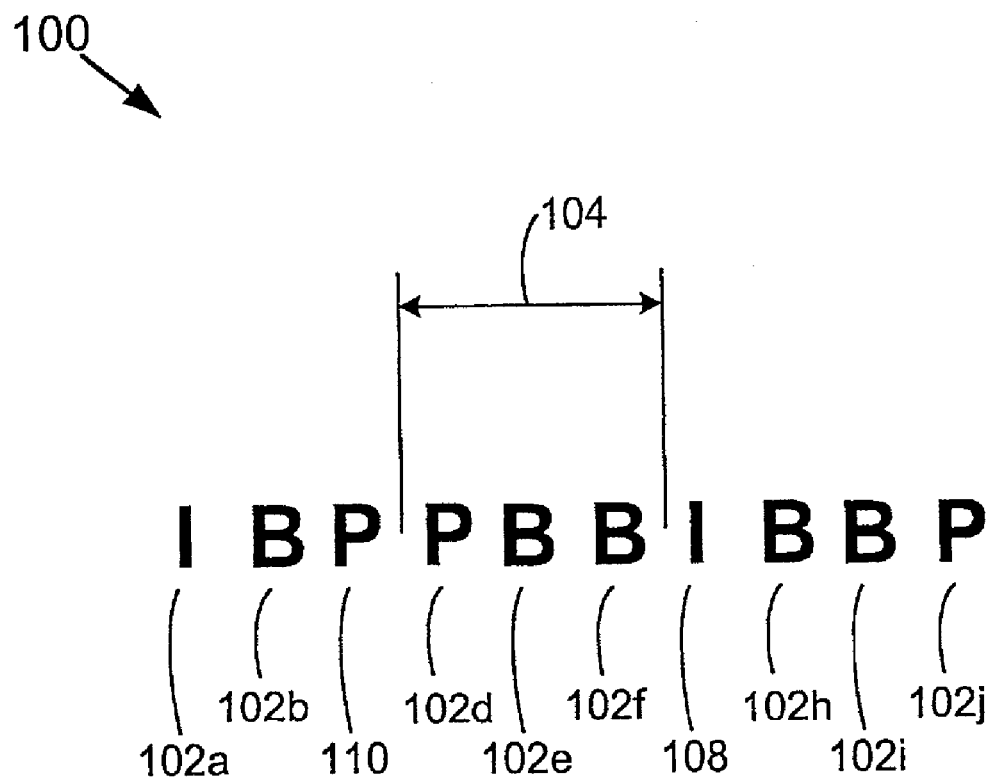

FIGS. 3B–3C show an illustrative recoding of elementary video stream portion 100 included in compressed bit stream 23, as performed by conditioning apparatus 44 of network device 14, in accordance with one embodiment of the present invention. Portion 100 of FIG. 3B comprises a sequential series of frames 102a–102j, shown in display order (i.e., at decoded time order). Insertion location 104 comprises a portion of compressed bit stream 23 in which local video content 106 may be subsequently inserted or spliced in. The first frame in digital insertion location 104 is P-frame 102d, which references I-frame 102a. B-frame 102c references P-frame 102d. In addition, the first frame, P-frame 102g, which immediately follows digital insertion location 104, references P-frame 102d.

FIG. 3C illustrates conditioned bit stream 25 comprising portion 100 after recoding by conditioning apparatus 44. As shown, P-frame 102g of FIG. 3B has been converted into a I frame 108. Recoding of a P-frame or B-frame into an I frame is a process that removes all temporal referencing between the P-frame or B-frame and any other coded pictures, e.g., a prior picture before the digital insertion location. In addition, B-frame 102c has been converted to P-frame 110, which only temporally references I-frame 102a. In this case, the B frame 102b is also recoded into another B (or P) frame because it references 102d which no longer exists. In addition, B frame 102b can also be recoded into another B which references 102a and 110.

Conversion of frames 102g and 102c according to conditioning apparatus 44 uses frame buffer 55 of FIG. 3A, which stores one or more earlier coded pictures that are involved in the recoding process. For example, P-frame 102g references the frame buffer at time 102d. Commonly, the frame buffer content at time 102d is accurate for frame 102g to be correctly coded into an I frame. This implies that the frame buffer already has encountered an I frame prior to frame 102g, which can typically be 15 frames ago. In other words, the conditioning device should have started the decoding process of the network bitstream at least 15 frames prior to the frame type conversion location in order to ensure correct frame buffer content. In cases where there are no I frames (such as the progressive scheme used for some MPEG encoders), an entire frame progressive refresh will have taken place before the content of the frame buffer can be used to regenerate the I frame. In this case, the decoding may be required to start as early as 30 frames ago.

As a result of this conditioning provided by conditioning apparatus 44, conditioned bit stream 25 has several unique properties. Firstly, compressed video data immediately before a splice point or digital insertion location (P-frame 110) has no temporal referencing or reliance with compressed video data on the other side of the splice point (P-frame 102d), which will be replaced by the first coded picture from the downstream local video content. Secondly, compressed video data immediately after the splice point is an I frame (I-frame 108), and this does not temporally reference compressed video data before the splice point. Thirdly, the first byte of I-frame 108 in the elementary video stream and the first byte of its associated PES packet are both aligned as the first payload byte of a new transport packet after the splicing, which optionally is aligned with the higher layer network packet (such as IP).

Since multiple back-to-back splicings may occur in compressed bit stream 25, e.g., for a given network avail, processing in this manner may be performed in multiple digital insertion locations within conditioning bit stream 25, and in some cases, even in a back-to-back fashion to allow multiple consecutive digital insertion locations.

Figure 4:
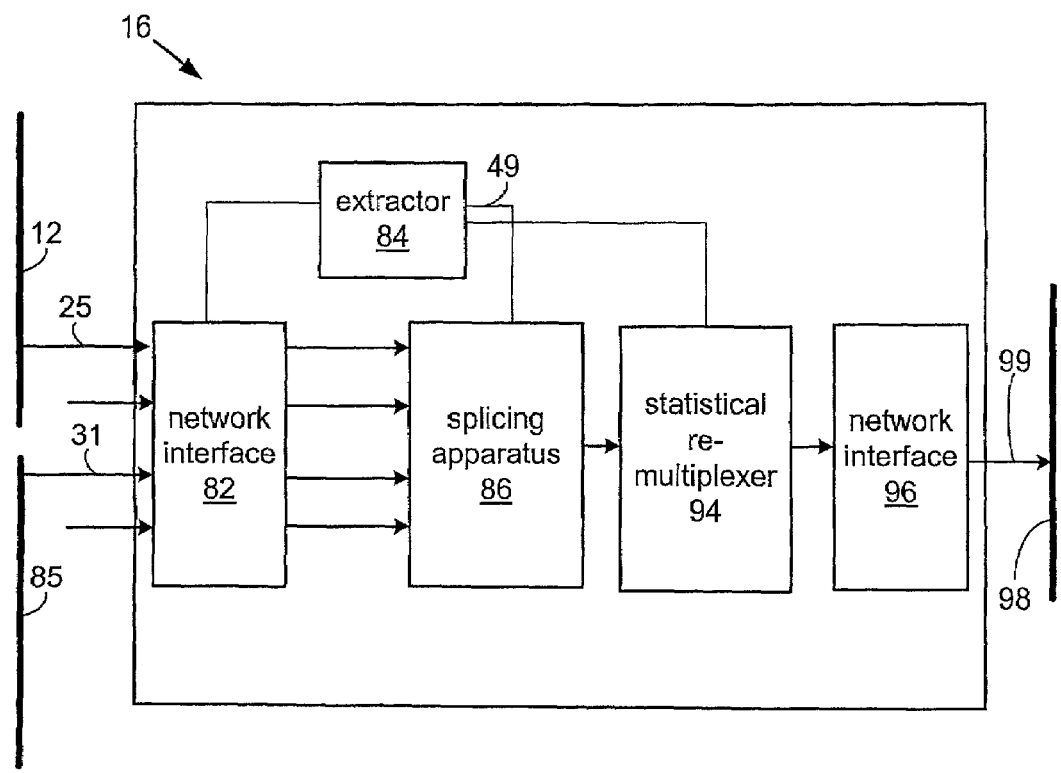
FIG. 4 illustrates another network device of FIG. 2 in more detail in accordance with one embodiment of the present invention.

FIG. 4 illustrates network device 16 of FIG. 2 in more detail in accordance with one embodiment of the present invention. Network device 16 combines video data from the two bit streams 25 and 31 to form an output bit stream 99. Network device 16 comprises a network interface 82, extractor 84, a splicing apparatus 86, a statistical remultiplexer 96, and a network interface 96.

Network interface 82 has a plurality of inputs to receive bit streams from a variety of input sources. In one embodiment, network interface 82 is configured to receive one of IP, ATM, frame relay, and SONET packets. For system 10 of FIG. 2, network interface 82 receives conditioned bit stream 25 from medium 12 and receives a second bit stream 31 from a local channel 85. The second bit stream 31 comprises local content such as advertising to be inserted into conditioned bit stream 25. Network interface 82 has a plurality of outputs that provide bit streams to splicing apparatus 86.

Extractor 84 is coupled to network interface 82 and obtains information within conditioning bit stream 25 that identifies one or more digital insertion locations suitable for inserting local video content within conditioned bit stream 25. In the case of transporting MPEG-2 compressed video using network packets, the information may also be contained in transport packets with a unique packet identification (PID). In this case, the extractor 84 first separates the PIDs containing the splice point locations. The extractor 402 also performs necessary extraction of the payload from the transport packets before passing the data to the splicing apparatus 86 for splicing.

In one embodiment, the information is packaged well in advance of a digital insertion location and is used to signal one or more upcoming digital insertion locations in the bit stream, well in advance of splicing at these locations. The information may also comprise a countdown message that allows network device 16 to countdown the time to an upcoming digital insertion location. In one embodiment, this information identifies network level locations in conditioned bit stream 25, such as specific ATM or IP packets, to insert the local video content. In another embodiment, the information is stored in a separate transport packet transmitted with conditioned bit stream 25.

In some cases, extractor 84 is referred to as a cue-tone extractor extracts a cue-tone message that provides the location of the next 'avail', and how long the avail is, for a multicast application. For example, the information stored in a transmission packet well ahead of the digital insertion location may specify that avail is coming and its length is 900 compressed video frames. Correspondingly, splicing apparatus 86 knows when the end of the avail and when the network bit stream is to begin again.

Splicing apparatus 86 splices compressed video data in the conditioned bit stream 25 and compressed video data in the second bit stream 31. Splicing (also known as bit stream concatenation) is a process that replaces part of a digital compressed bit stream by another compressed bit stream, which may have been encoded off-line in a different location or at a different time. Splicing includes a series of transitions made between a first bit stream and a second bit stream. Each transition is called a splice point.

Since there is no temporal dependency for packets on opposite sides of the splice points in conditioned bit stream 25, splicing of the local content by splicing apparatus 86 may occur without recoding the video data in either bit stream 25 or 31. More specifically, since the conditioned bit stream 25 was previously recoded to remove temporal relationships between video data before and after the digital insertion locations, splicing of the two bit streams 25 and 31 may occur without recoding of data with bit stream 25.

Splicing in accordance with one embodiment of the present invention occurs between network packets of multiple bit streams. Since the splice points for the digital insertion have already been identified (via information obtained by extractor 84), and network packets have already been created at each of the splice points by network device 14, splicing by splicing apparatus 86 may occur between network packets.

Splicing on a network packet level according to network device 16 may then occur without extracting compressed video data from network packets and/or decoding and re-encoding compressed video data—for either compressed bit stream being spliced together. For a network device such as network device 16, the reduced complexity in not having to decode video frames is significant. As a result, a network feed may then be spliced with the local content without introducing significant computational complexity and/or requiring additional decoding hardware. In one embodiment, network device 16 is non-MPEG compliant. In this case, network device 16, which is configured for IP switching and not MPEG switching, then becomes capable of MPEG content splicing. The computational savings are more pronounced when network device 16 is required to repeatedly process and transmit large numbers of bit streams in a limited time. The output of splicing apparatus 86 is an output bit stream comprising the compressed vide data from conditioned bit stream 25 and the compressed video data in the second bit stream 31.

Network device 16 also comprises a statistical re-multiplexer 94. In one embodiment, statistical re-multiplexer 94 uses bit rate profile information stored in conditioned bit stream 25 that describes the bit rate profile of conditioned bit stream 25. This information may be used to help statistical re-multiplexer 94 combine conditioned bit stream 25 with another bit stream. For example, the bit rate profile information may describe bit rate profile of digital insertion location 104 that is replaced by the downstream content 31. The bit rate profile information is provided to statistical re-multiplexer 94 by extractor 84.

Figure 3D:
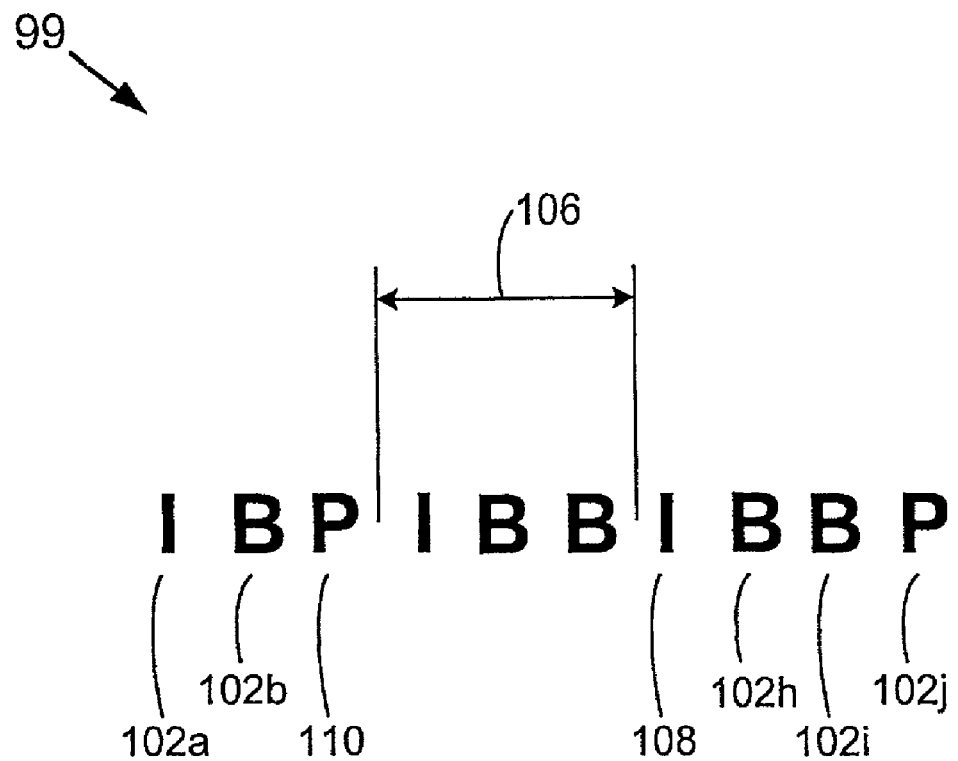
FIG. 3D illustrates an output bit stream provided by the network device of FIG. 4 after insertion of local video content into a conditioned bit stream in accordance with one embodiment of the present invention.

The output of the statistical re-multiplexer 94 is provided to network interface 96, which is coupled to medium 98. The output of network interface 96 forms the output of the bit rate converter 16, namely, output bit stream 99. FIG. 3D illustrates a portion of output bit stream 99 after insertion of local video content 106 into conditioned bit stream 25 by network device 16. Network interface 96 outputs formats the data in conditioned bit stream 25 according to the protocol on medium 98 and transmits the data to a receiver connected to medium 98, e.g., a set-top box in a home. In one embodiment, output bit stream 99 is transmitted in real-time. The network interface 56 may be a transmitter for any of those known in the art for DSL networks or ATM networks, for example.

Although the present invention has been described with respect to splicing together compressed video data provided by local advertising with compressed video data provided by a video service during transmission, the present invention is not limited to the broadcast scenario described above and may include combining two more bit streams from any sources at any point in data transmission. Thus, the compressed video data spliced together may include compressed video data from any two separate compressed video data bit streams received at a network device.

In addition, in all the figures and discussions for the present invention, it is important to note that the channels are bidirectional, even though the present invention is described and shown by focusing on a single direction for ease of understanding. The present invention focuses on the transmission in a direction from the network device 14 to the network device 16. Thus, a network interface acting as a transmitter within network device 16 may also act as a receiver in the reverse direction, e.g., from network device 16 to network device 14 of FIG. 2, for example).

Figure 5:
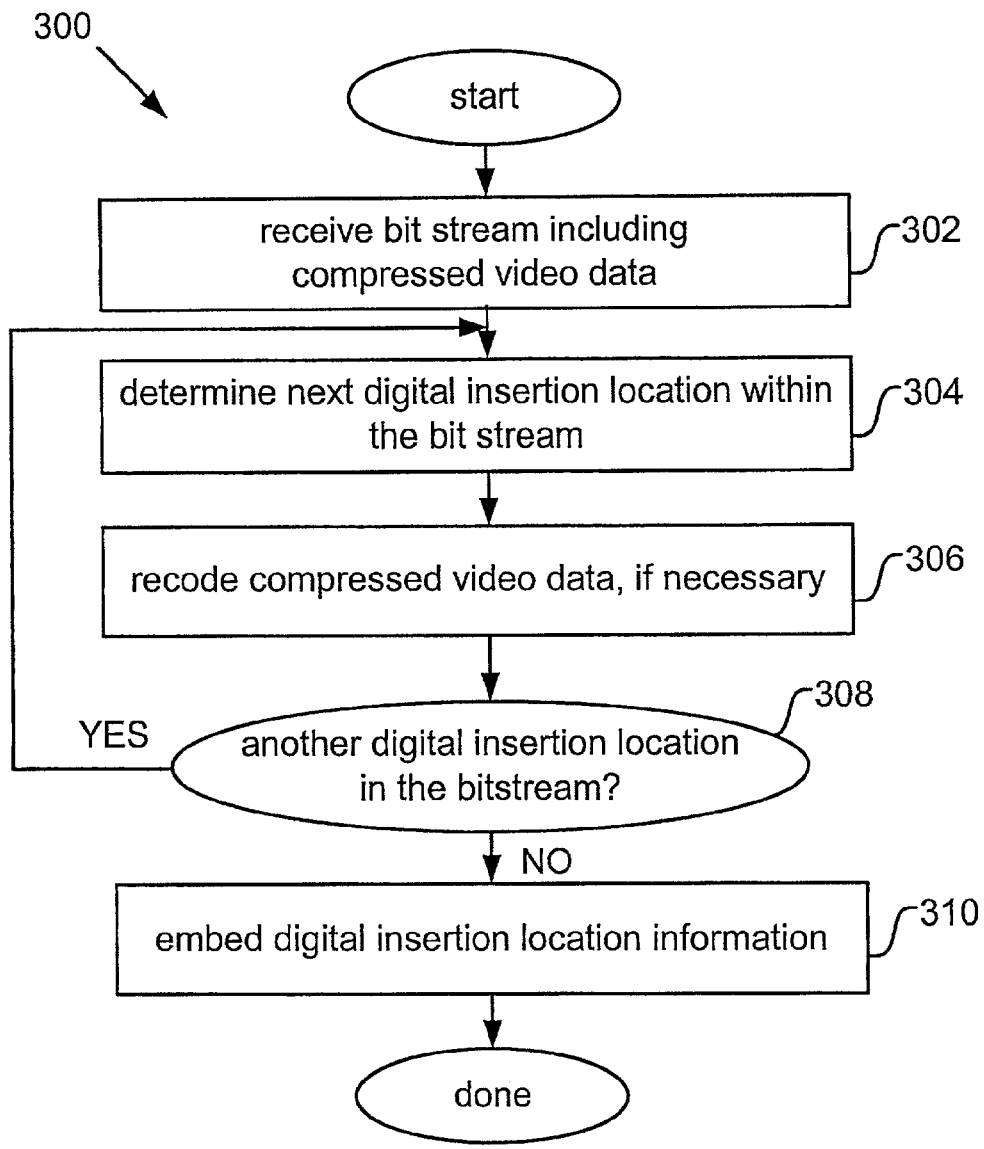
FIG. 5 illustrates a process flow for providing a conditioned bit stream comprising modified compressed video data in accordance with one embodiment of the present invention.

Two particular communication channels that are becoming increasingly common and suitable for use with the present invention is IP networks and Asynchronous Transfer Mode (ATM) networks. Both networks are based on different transport protocols which can be used to transport data or multimedia bit streams with a pre-specified quality of service. For example, in an IP network, multiple MPEG2 transport packets can be encapsulated into IP payload via the RTP protocol format. Typically multiple MPEG-2 transport packets are encapsulated into a single IP packet. To satisfy the splice point data alignment requirement, the first MPEG-2 transport packet payload should contain the first data byte for the underlying splice point. ATM protocol specifies how data is first packetized into fixed sized data units, called cells. It also specifies how such a cell stream can be multiplexed, de-multiplexed, switched and routed between different locations to support end-to-end connections at given bit rate and/or quality of service (QOS). In ATM networks, connections may be established with pre-determined grade of QOS. Conditions of network utilization, along with call admission control, sometimes may prevent a new connection being established at the given bit rate or given quality of service. In such cases, the requested connection may either have to be rejected or a new set of admissible connection parameters have to be negotiated between the network service provider and the user requesting the connection. When MPEG-2 transport packets are carried as ATM cell payload, each MPEG-2 packet is broken into multiple ATM cells, called the segmentation process, through the use of ATM Adaptation Layer. Therefore, the MPEG packet that carries the first splice point payload byte is also be properly aligned with the ATM FIG. 5 illustrates a process flow 300 for providing a conditioned bit stream comprising modified compressed video data in accordance with one embodiment of the present invention. Process flow 300 may take place in any network device such as the network device 700 of FIG. 7 or any of the network devices of FIG. 2. Processes in accordance with the present invention may include up to several additional steps not described or illustrated here in order not to obscure the present invention. While compressed video bit stream processing will now be described as a method, those skilled in the art will recognize that the present invention encompasses a system or software having units capable of performing the actions as described below.

Process flow 300 begins by receiving a bit stream including compressed video data (302). Upon receiving the bit stream at a headend or any other suitable network device, the network device may then store the video data on local memory, remove the compressed data from the bit stream, e.g., by unpacking the compressed video data from the network packets, or otherwise prepare the data for processing.

One or more digital insertion locations within the bit stream are then determined (304). In one embodiment, a cue-tone extractor obtains a cue-tone message from the bit stream and uses the cue-tone message to identify splice points associated with one or more digital insertion locations.

Based on known locations of potential splice points where downstream video content may be inserted into conditioned bit stream 25, compressed video data within the bit stream may be modified. More specifically, recoding compressed video data around each splice point may be performed such that temporal reliance between compressed video data before the splice point and compressed video data after the splice point is removed (306). A specific example where recoding compressed video data is useful is illustrated in FIGS. 3B–3C. This process of recoding around digital insertion locations (304 and 306) is repeated for each digital insertion location in the bit stream.

Recoding of some frames around a splice point may include decoding and re-encoding according to conventional MPEG techniques. MPEG decoding comprises processing the compressed video data with inverse transform coding, de-quantization, and VLC decoding. After transform coding and quantization, each image is decoded comprising de-quantization and inverse transform coding before motion compensation using motion vectors extracted from the bitstream. The motion compensation process sums the residual picture data with the picture data in the frame buffer to result in updated frame picture in the frame buffer. The motion vectors can also be re-used to encode the frame in the frame data into another output compressed bitstream. This process of motion compensation including adding the motion vectors to the video data and encoding produces modified compressed video data relative to that as received. The product of the recoding process is modified compressed video data.

In some cases, information describing the digital insertion location information is embedded into the bit stream (310). In one embodiment for an MPEG PES format, the information is embedded in the payload of PES packets with different reserved stream IDs. Presentation Time Stamps (PTS) and Decoding Time Stamps (DTS) in the PES header may be used to provide synchronization between the information PES packets. When the information is contained in a PES packet, the information may be placed inside the PES packet header PES_packet_data_byte field. For MPEG processing, this allows the PES header parser to extract all of the bytes of PES_packet_data_byte without inspecting the content of the data section. In another embodiment for MPEG transport stream operation, the information is placed in separate transport packets each having a unique packet identification (PID). The information may be stored as the payload of the transport packets.

The product of process flow 300 is a conditioned bit stream that comprises the modified compressed video and information describing the digital insertion locations. This conditioned bit stream may be stored or formatted for transmission onto a network, as described above.

Figure 6:
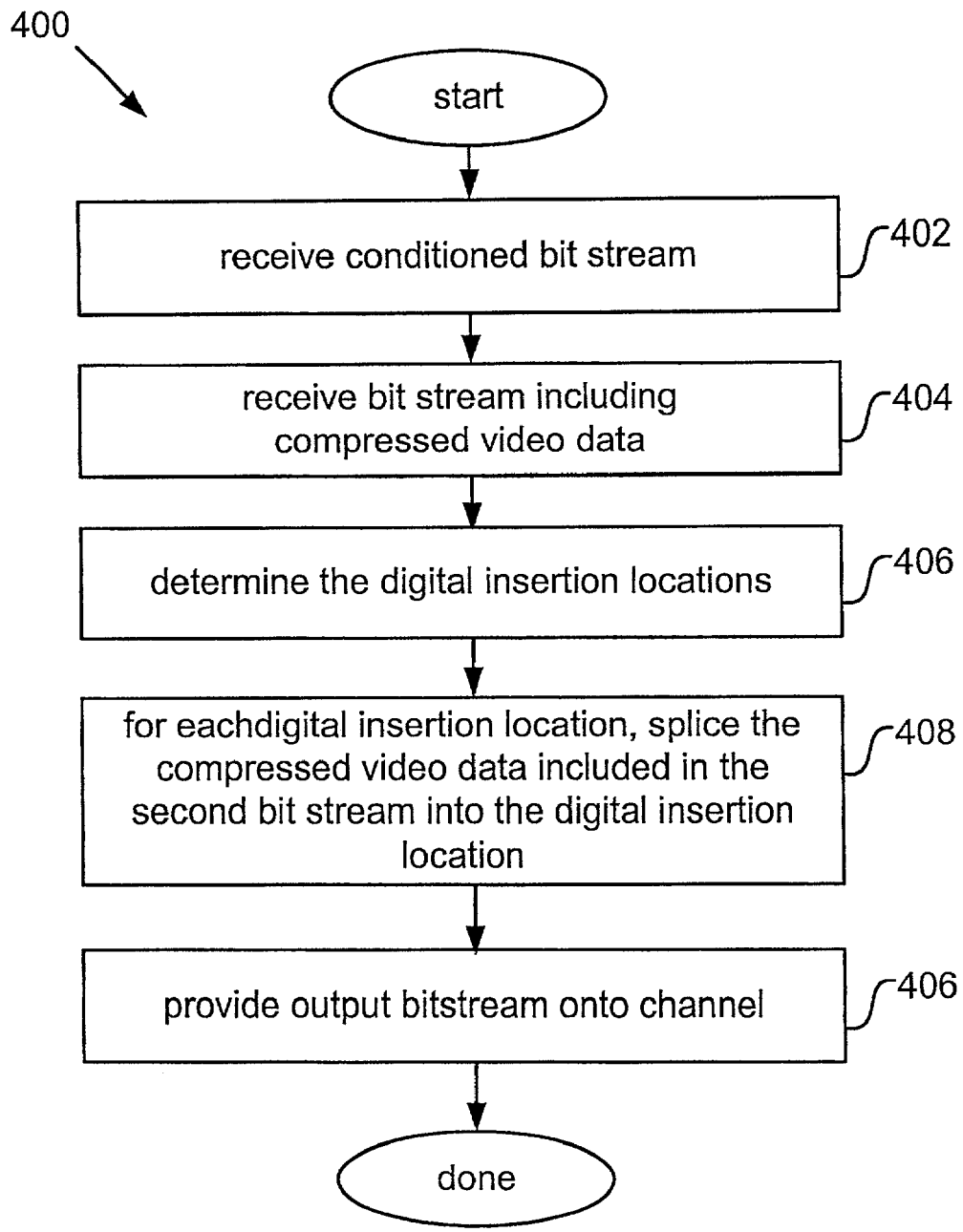
FIG. 6 illustrates a process flow for providing a bit stream onto a channel in accordance with one embodiment of the present invention.

FIG. 6 illustrates a process flow 400 for providing a bit stream onto a channel in accordance with one embodiment of the present invention. The process flow 400 may take place in any network device such as the network device 700 of FIG. 7 or any of the network devices of FIG. 2. Processes in accordance with the present invention may include up to several additional steps not described or illustrated here in order not to obscure the present invention. While processing will now be described as a method, those skilled in the area will recognize that the present invention encompasses a system or software having units capable of performing the actions as described below.

Process flow 400 begins by receiving a conditioned bit stream comprising a digital insertion location and compressed video data (402). A second bit stream comprising compressed video data is also received (404). The video data corresponds to video content to be inserted into the conditioned bit stream. In one embodiment, the network device receives the second bit stream first and stores the video data from the second bit stream in local memory until the conditioned bit stream is received.

One or more digital insertion locations within the conditioned bit stream are then determined along with allocating the video content to be inserted in each digital insertion location (406). In one embodiment, an extractor obtains information describing the digital insertion locations from the bit stream and uses the information to identify splice points associated with the digital insertion locations.

Using knowledge of the digital insertion locations and knowledge of the compressed video data to be inserted into the conditioned bit stream, video data from the two bit streams are then spliced together (408). More specifically, splicing includes inserting the compressed video data from the second bit stream into a digital insertion location by splicing network packets from the second bit stream and network packets from the conditioned bit stream. The splicing provides an output bit stream comprising compressed video data included in the conditioned bit stream and the compressed video data included in the second bit stream. The output bit stream is then provided onto the channel (410).

The methods of this present invention may be implemented on various systems. For example, the invention may be implemented on routers and/or switches. In a specific embodiment, the systems of this invention may be specially configured routers such as, for example, specially configured router models 1600, 2500, 2600, 3600, 4500, 4700, 7200, and 7500 available from Cisco Systems, Inc. of San Jose, Calif. A general architecture for some of these machines will be given below. In an alternative embodiment, the methods of this invention may be implemented on a video streaming server, or a general-purpose network host machine such as a personal computer or workstation. Further, the invention may be at least partially implemented on a card (e.g., an interface card) for a network device or a general-purpose computing device.

Generally, the techniques of the present invention may be implemented on software and/or hardware. In a specific embodiment of this invention, the technique of the present invention may be implemented in software such as an operating system or in an application running on an operating system. A software or software/hardware hybrid system of this invention is preferably implemented on a general-purpose programmable machine. Such a programmable machine may be a network device designed to handle network traffic. Such network devices typically have multiple network interfaces. One important class of device that may be used to implement the present invention is the Cable Modem Termination System.

FIG. 7 shows a block diagram of a specific embodiment of a Cable Modem Termination System (CMTS) 700 which may be used to implement certain aspects of the present invention. As shown in FIG. 7, the CMTS 700 may comprise a plurality of routing engines (e.g. 701a, 701b).

Each of the routing engines may include a variety of similar modules and/or components. According to a specific embodiment, Routing Engine A may be configured or designed to include a plurality of functionally different modules or components, including, for example, a Forwarding Processor (FP) Module 711a adapted to provide packet forwarding functionality; a Route Processor (RP) Module 703a adapted to implement routing or forwarding operations; a utility component 702a adapted to provide system clock and timestamp functionality; etc. The routing engine components provide may be configured to provide layer one, layer two, layer three and layer four functionality as well as quality of service (QoS) functionality.

According to a specific implementation, the RP Module 703a may be configured as a processor-based routing system comprising functionality incorporated within a typical router, such as, for example, specially configured router models 1600, 2500, 2600, 3600, 4500, 4700, 7200, 7500, 10012, and 12000 available from Cisco Systems, Inc. of San Jose, Calif. For example, as shown in the embodiment of FIG. 7, the RP Module 703a comprises a general-purpose processor 705a (e.g., a MIPS route processor) coupled to a system controller 709a and memory 707a.

The memory 707a may comprise synchronous dynamic random access memory (SDRAM) storage locations addressable by the processor 705a for storing software programs, video data, and data structures accessed by the components. A network routing operating system, portions of which may reside in memory and executed by the route processor, functionally organizes the router by invoking network operations in support of software processes executing on the router.

The RP processor 705a may be configured to construct and load routing tables used by the FP Module 711a. The processor 705a may also be configured or designed to perform configuration management functions of the routing engine 701a, and to communicate with neighboring peer, standby, and/or backup routers to exchange protocol data units used to construct the routing tables in accordance with conventional routing algorithms. It will be apparent to those skilled in the art that other memory types, including various computer readable media, may be used for storing and executing program instructions pertaining to the operation of the routing engine.

Interface circuitry 727a may be coupled to the respective interface circuitry 733a, 733b of line cards 731a, 731b. According to various embodiments, the FP Module 711 may comprise a processor 713a and memory 715a for handling transport layer 717 and network layer 719 functionality. The FP Module 711a may also be configured to provide transaction compacting functionality, data parcel tunneling functionality, video data transmission functionality, etc.

According to different embodiments of the present invention, one or more of the routing engines may be configured to communicate with a plurality of line cards (e.g. 731, 735) via point-to-point links. For example, as shown in FIG. 7, each of the plurality of line cards 731 and 735 are connected to each of the routing engines 701a, 701b via point-to-point links 741 and 743. One advantage of the point-to-point link configuration is that it provides additional reliability in that the failure of one or more line cards will not interfere with communications between other line cards and the routing engine(s). For example, if Line Card A 731a suddenly failed, each of the routing engines would still be able to communicate with the other line cards.

The techniques of the present invention may be implemented on various general purpose Cable Modem Termination Systems. In a specific embodiment, the systems of this invention may be specially configured CMTSs such as, for example, specially configured models in the uBR-7200 and uBR-10012 series of CMTSs available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Regardless of network device's configuration, it may employ one or more memories or memory modules (e.g., memory 707a, 715a, etc.) configured to store video data, program instructions for the network operations and other functions of the present invention described herein. The program instructions may specify an operating system and one or more applications, for example. Such memory or memories may also be configured to store data structures, video data, or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

While the discussion to this point has focused on techniques for cable networks, the technology of the present invention may be applied to any access or shared-access network having a plurality of hosts or nodes which share at least one channel for communicating with at least one "Head End" in the network. Examples of shared-access networks include, in addition to cable networks, wireless networks, Ethernet, FastEthernet, GigabitEthernet, LANs, etc. In the cable network, the plurality of nodes represents a plurality of cable modems that communicate with at least one CMTS at the centralized termination system using at least one shared-access upstream and downstream channel.

In general, the methods and apparatus described above may be implemented on a traffic handling device (e.g., a switch or router) for providing capability in a network having at least one traffic handling device (e.g., another switch or router) that provides normal service to a host.

While this invention has been described in terms of several preferred embodiments, there are alterations, permutations, and equivalents which fall within the scope of this invention which have been omitted for brevity's sake. It is therefore intended that the scope of the invention should be determined with reference to the appended claims.

What is claimed is:

1. A network device for providing an output bit stream onto a camel, the network device comprising:
   a network receiver interface configured to receive a conditioned bit stream comprising digital insertion information that includes a splice point location and associated available insertion space and to receive a second bit stream comprising compressed local content video data;
   a splicing apparatus configured to splice the local content video data into the conditioned bit stream at the splice point location and within the available insertion space, the output bit stream; and
   a network transmitter interface that outputs the output bit stream onto the channel.

2. The device of claim 1 wherein since the digital insertion information provides the available insertion space prior to the splicing of the local video data to the splicing apparatus, the splicing apparatus does not monitor the insertion of the local content video data for an end of insertion signal.

3. The device of claim 1 wherein the conditioned bit stream and the second bit stream are formed of network data packets and wherein the splicing apparatus splices network packets from the second bit stream and network packets from the conditioned bit stream.

4. The device of claim 1 further comprising an extractor that obtains the digital insertion location information from the conditioned bit stream.

5. The device of claim wherein network interface is configured to receive one of IP, ATM, frame relay, and SONET packets.

6. The device of claim 1 wherein the conditioned bit stream copses MPEG compressed video data.

7. The device of claim 6 wherein the splicing apparatus is configured to combine the compressed video data included in the conditioned bit stream and the compressed video data included in the second bit stream without removal of MPEG compressed video data from the network packets of each bit stream.

8. The device of claim 6 wherein the splicing apparatus is configured to combine the compressed video data included in the conditioned bit steam and the compressed video data included in the second bit stream without decompression of the MPEG compressed video data of each bit stream.

9. The device of claim 6 wherein the splicing apparatus is configured to combine the compressed video data included in the conditioned bit stream and the compressed video data included in the second bit stream without decompression of the MPEG compressed video data of each bit stream.

10. The device of claim 9 wherein the conditioned bit stream comprises compressed video data having no temporal reliance between compressed video data before a splice point corresponding to the digital insertion location and compressed video data after the splice point.

11. A method for providing an output bit stream onto a channel, the method comprising:
   receiving a conditioned bit stream comprising digital insertion location information that includes a splice point location and associated available insertion space and a second bit steam comprising compressed local content video data;
   splicing the compressed local content video data included in the second bit stream into the conditioned bit stream at the digital insertion location consistent with the available insertion space by splicing network packets from the second bit steam and network packets from the conditioned bit stream the output bit steam comprising the conditioned bit stream and the compressed video data included in the second bit stream; and
   providing the output bit stream onto the channel.

12. The method of claim 11 further comprising obtaining the information describing the digital insertion location from the conditioned bit stream.

13. The method of claim 12 further comprising signaling a splice point corresponding to the digital insertion location and the available insertion space using the information in advance of the splicing.

14. The method of claim 12 wherein the conditioned bit stream comprises MPEG compressed video data.

15. The method of claim 14 wherein the splicing occurs without decompression of the MPEG compressed video data of the conditioned bit steam.

16. The method of claim 12 wherein splicing combines compressed video data included in the conditioned bit stream and the compressed video data included in the second bit steam without removal of MPEG compressed video data from the network packets of each bit stream.

17. A network device for providing a bit stream onto a channel, the network device comprising:
   a network interface configured to receive a conditioned bit stream comprising a digital insertion location and associated available insertion space and to receive a second bit stream comprising compressed video data;
   a splicing apparatus configured to splice the compressed video data included in the second bit stream into the digital insertion location and within the available insertion space by splicing network packets from the second bit stream and network packets from the conditioned bit stream, the splicing apparatus providing an output bit stream comprising compressed video data included in the conditioned bit stream and the compressed video data included in the second bit stream; and
   a network interface that outputs the output bit stream onto the channel, wherein the device has no capability to recognize MPEG bitstream syntax or to process MPEG compressed data.

18. The device of claim 17 further comprising an extractor that obtains information from the conditioned bit stream that describes the digital insertion location.

19. The device of claim 18 wherein the extractor is further configured to countdown the time to reach a splice point corresponding to the digital insertion location.

20. The device of claim 17 wherein network interface is configured to receive one of IP, ATM, frame relay, and SONET packets.

21. The device of claim 17 wherein the conditioned bit stream comprises MPEG compressed video data.

22. The device of claim 21 wherein the splicing apparatus is configured to combine the compressed video data included in the conditioned bit stream and the compressed video data included in the second bit stream without removal of MPEG compressed video data from the network packets of each bit stream.

* * * * *